United States Patent [19]

Plavetich

[11] Patent Number: 4,699,418
[45] Date of Patent: Oct. 13, 1987

[54] CONVERTIBLE SEAT APPARATUS AND METHOD

[75] Inventor: Richard G. Plavetich, Royal Oak, Mich.

[73] Assignee: General Motors Corporation, Detroit, Mich.

[21] Appl. No.: 846,104

[22] Filed: Mar. 31, 1986

[51] Int. Cl.⁴ ............................ B60N 1/02; B60N 1/10
[52] U.S. Cl. ...................................... 296/65 R; 296/69; 296/66; 297/331
[58] Field of Search .......................... 296/65 R, 66, 69; 297/331, 334, 341

[56] References Cited

U.S. PATENT DOCUMENTS

| | | | |
|---|---|---|---|
| 2,418,787 | 4/1947 | Nelson | 296/66 X |
| 2,926,949 | 3/1960 | Himka et al. | 296/66 |
| 2,997,335 | 8/1961 | May | 296/66 |
| 3,011,822 | 12/1961 | May et al. | 296/66 |
| 3,311,405 | 3/1967 | Brennan et al. | 296/66 |
| 3,727,976 | 4/1973 | Lystad | 296/66 X |
| 4,227,736 | 10/1980 | LeBault et al. | 296/65 R |
| 4,273,376 | 6/1981 | Duguet et al. | 296/65 R |
| 4,382,629 | 5/1983 | Froumajou | 296/66 X |
| 4,390,205 | 6/1983 | Louis | 296/66 X |
| 4,475,763 | 10/1984 | Hamatani et al. | 296/65 R |
| 4,475,769 | 10/1984 | Crawford et al. | 297/331 |

Primary Examiner—Dennis H. Pedder
Attorney, Agent, or Firm—Ernest E. Helms

[57] ABSTRACT

The present invention provides a convertible seat apparatus and method of utilizing the same for a vehicle seat having two major alternative positions. The seat can be converted to a compact forward generally vertical position utilizing the back of the upper seat member as a cargo barrier. The seat member can also be folded into a another alternative position to utilize the back of the seat as a floor extension within the vehicle. By the use of the present invention the seat back can serve both as a cargo barrier as well as a floor extension depending upon the configuration desired.

13 Claims, 5 Drawing Figures

CONVERTIBLE SEAT APPARATUS AND METHOD

FIELD OF THE INVENTION

The field of the present invention is that of convertible vehicle seats. More particularly, the field of the present invention relates to convertible seats which can be folded to a position to provide a cargo barrier. More particularly, the present invention also relates to convertible vehicle seats utilized in vehicles having bi-level flooring wherein the convertible seat may be utilized to provide an extension of one of the floor levels of the vehicle.

DISCLOSURE STATEMENT

The use of convertible seats is well known in the realm of automotive vehicles such as vans and station wagons. An example of a convertible seat is shown and described in Maertens, commonly assigned U.S. Pat. No. 4,206,946.

It is sometimes desirable to have a convertible seat which, when folded from its normal seating position, will expand the cargo space area and also act as a barrier between the cargo area and the other portions of the vehicle. It is also often desirable to have a convertible seat which may be folded to such a position to serve as an extension of the floor to maximize the available cargo space within a vehicle. The second described position is especially relevant when the convertible seat is utilized in a van having dual floor levels. Typically, the dual floor type vans will place the convertible seat on a floor level above the rear wheel. The forward first and second row seats are at a floor level lower than that the top of the rear wheel.

For maximum utility, it is desirable to provide such a convertible seat which can be folded into a floor extension, or a cargo barrier as needs provide. Typical convertible seats are comprised of an upper seat member which was pivotally connected to a femur seat member. When the seat is in the normal seating position, the rear of the seat back is typically a hardened member which provides a barrier between the seat and luggage area of the vehicle. Prior to the present invention, when it was desired to fold the seat to a position to free additional space and to act as a cargo barrier at a more forward position in the vehicle, the bottom of the seat member was utilized as a cargo barrier. Therefore, both the back of the upper member and the bottom of the femur member were required to be structurally rigid to perform their cargo barrier functions. Both of the hardened surfaces of the upper and femur members were typically metal. The metal added cost and weight to the seat over and above that which would be required for a non-convertible seat.

SUMMARY OF THE INVENTION

To overcome the above-noted and other problems, the present invention is brought forth. The present invention comprises a convertible seat apparatus and method of utilization of the same which provides a seat convertible into two separate optional positions. The seat of the present invention may be converted into a first optional position wherein it serves as a cargo barrier. The seat of the present invention may also be converted into a second optional condition where it serves as a floor extension. The present invention also provides an added feature in that it utilizes the hardened seat back as a cargo barrier as well as the floor extension. Therefore, only the seat back need be a hardened surface capable of bearing a load. The weight and expense involved with a hardened femur member underside can be eliminated.

It is an object of the present invention to provide a vehicle seat convertible into two separate optional positions, one being that of a cargo barrier and the second being that of a floor extension. It is another object of the present invention to provide a vehicle seat convertible to two positions as heretofore described utilizing the seat back as the possible load carrying surface both in the cargo barrier position and in the floor extension position.

It is another object of the present invention to provide a method of converting a vehicle seat from a regular seating position into a cargo barrier position or into a floor extension position.

It is yet another object of the present invention to provide a vehicle convertible seat comprising in combination an upper seat member having a back in a generally vertical orientation and a femur member adjacent the upper member extending forward in a general horizontal orientation, and a first link pivotally connected with the vehicle at a forward end extending rearwardly, a second link pivotally connected with the first link generally opposite the first link's pivotable connection with the vehicle, the second link being pivotally connected with the femur member at its end opposite the first link, a third link pivotally connected with the vehicle rearward of the pivotal connection of the first link with the vehicle and the third link having means of pivotal connection with the femur and said upper seat members at its end opposite its pivotal connection with the vehicle and wherein the seat has a first horizontal position wherein the upper seat member mates with the femur seat member and the upper seat back is above the femur member and the seat being convertible to a first generally vertical position from the first horizontal position wherein the seat back is rearward of the femur member and the seat being convertible to a second horizontal position wherein the mated seat members are forwardly and lowerly displaced from the first horizontal position and wherein the seat back is above said femur member.

Other objects, desires and advantages of the present invention will become more apparent to those skilled in the art as a nature of the invention as better understood from the accompanying drawings and a detailed description.

DETAILED DESCRIPTION OF THE DRAWINGS

Figure 1:
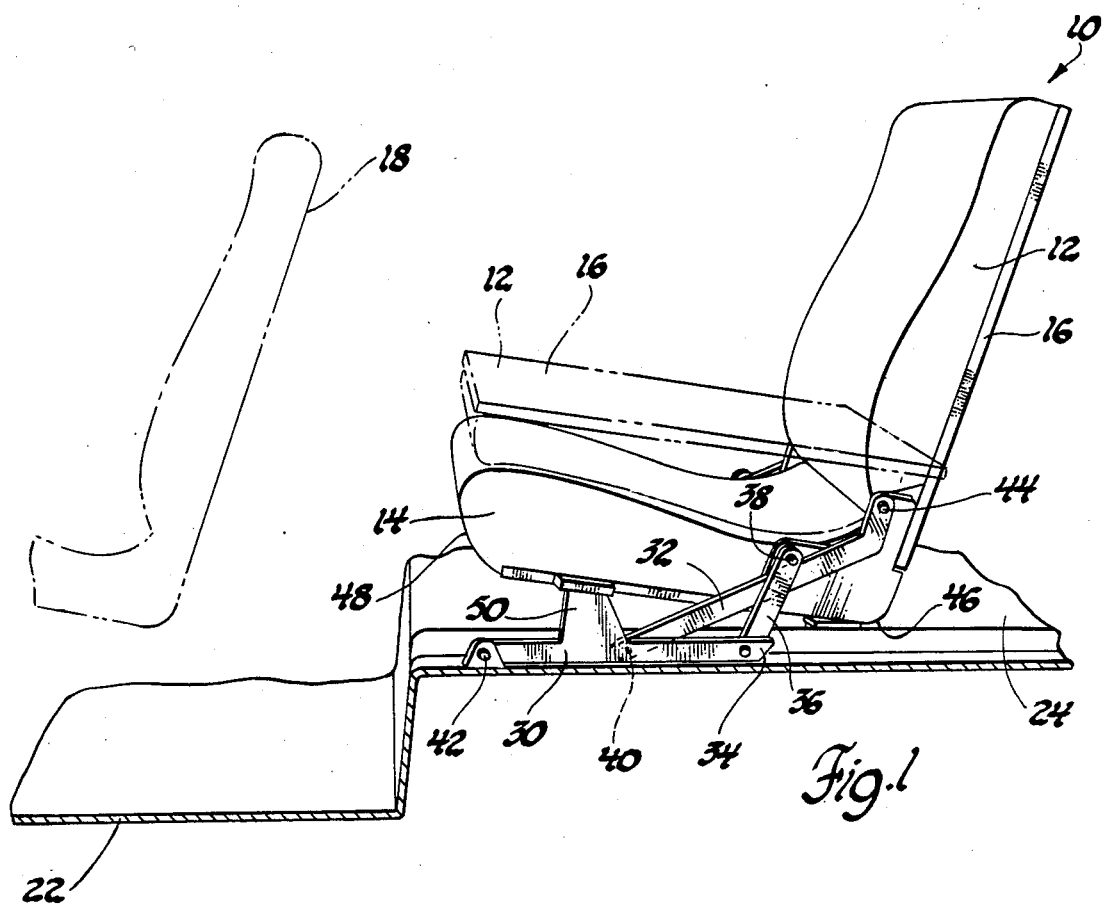
FIG. 1 is a side elevational view showing the seat in a normal seating position and showing in phantom the seat in its first horizontal position.

Referring to FIG. 1, the seat 10 of the present invention has two major members. The first member is the upper seat 12 which is generally vertically oriented having a hardened back 16. Extending forwardly from the upper seat 12 and adjacent thereto is the femur seat member 14 provided for supporting the femur region of the seat occupant.

The femur seat 14 member in the preferred embodiment of the present invention will typically be mounted in the vehicle behind a secondary row seat. Typically, the secondary row seat 18 is on a floor 22 lower than the floor 24 on which seat 10 is mounted.

The convertible seat 10 is pivotally connected to the vehicle floor 24 via a forward end of a rearward extending first link 30. At the first link's rearward end 34 (opposite its pivotal connection 42 with the vehicle), is a pivotally connected second link 36. The second link at its end 38 (opposite the pivotal connection with the first link), is pivotally connected with the femur member 14.

Rearward of the pivotal connection of the first link 30 with the vehicle is a third link 32 having a first end pivotally connected with the vehicle at point 40. Point 40 is horizontally aligned with the pivotal connection 42.

In the embodiment shown, the second end of the third link 32 shares a common pivotal connection 44 with the femur 14 member and upper seat 12. However, it is apparent to those skilled in the art that various combinations of pivotal connections such as pivotally connecting the third link 32 to the femur member 14 only and then pivotally connecting the upper seat 12 to the femur member 14 could be utilized.

Typically the femur member rearward end 46, rests on the vehicle floor 24 or on a mount adjacent to the floor. The forward end 48 of the femur member is supported by a generally vertical arm extension 50 of the first link. The above-described construction causes the inclination of the femur member 14.

To convert the seat to one of its optional positions, the upper seat 12 is first angularly displaced to mate with the femur member 14 in a first horizontal position. In the first horizontal position seat back 16 is above the femur member 14.

Figure 2:
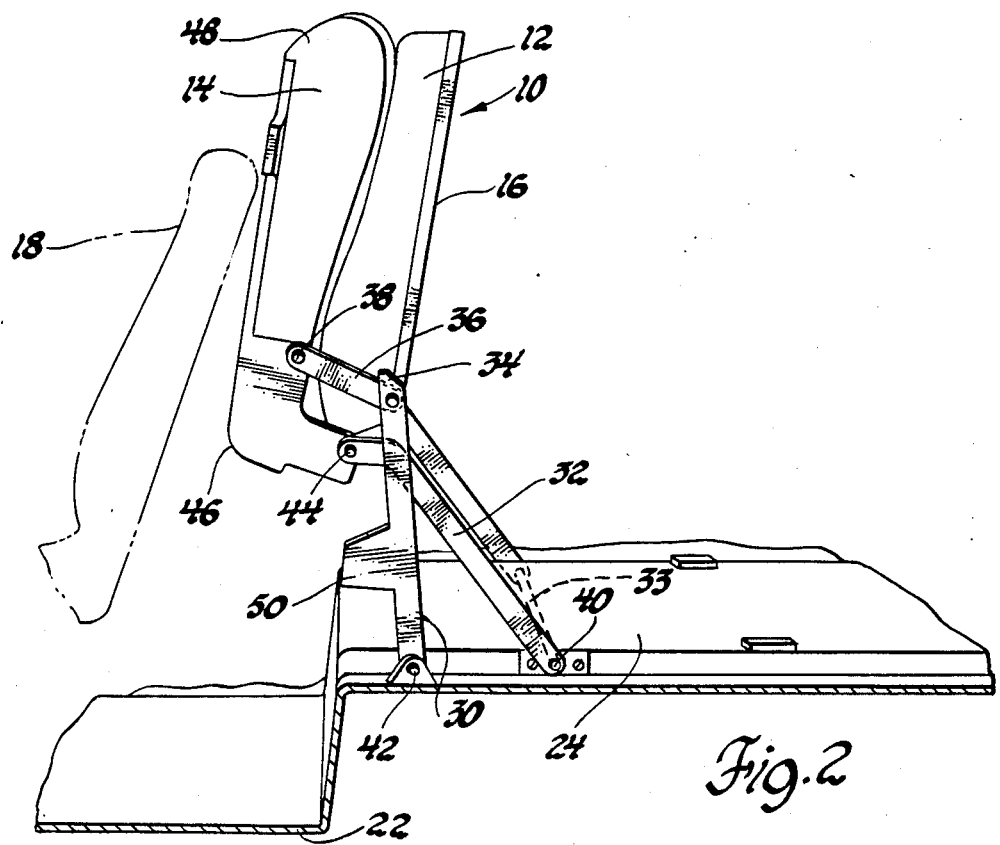
FIG. 2 is a side elevational view of the angularly displaced mated seat members in an intermediate vertical position.
Figure 3:
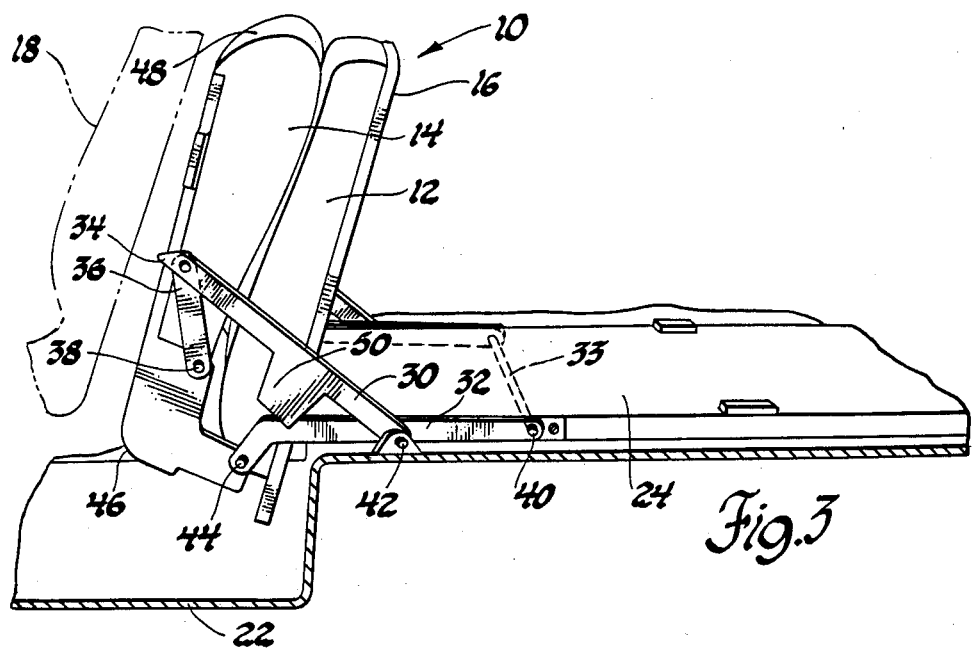
FIG. 3 is a side elevational view of the mated seated members in a first forward vertical position which is utilized as the cargo barrier position.

Referring to FIG. 2, the forward end 48 of the femur member is lifted upwards. The rearward end 46 of the seat moves forward as the mated seats are angularly displaced into an intermediate extended vertical position. Referring to FIG. 3, the mated seat members 12 and 14 are downwardly displaced to a first vertical position which is forward of the first horizontal position. In the first vertical position the seat back 16 will act a a cargo barrier for the load placed in the area of the vehicle which was previously taken up by the seat 10 above floor 24. In the configuration as illustrated in FIG. 3, the second row seat 18 in front of the convertible seat 10 need not be removed from its standard position.

Figure 5:
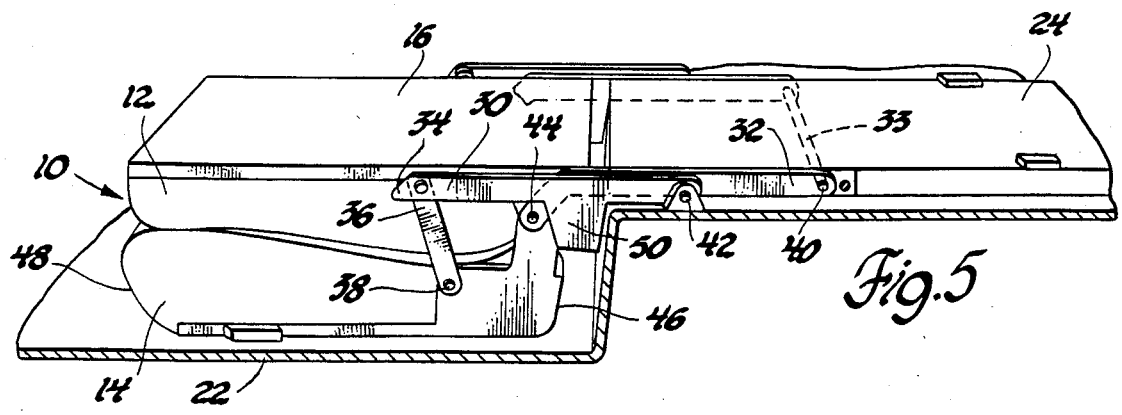
FIG. 5 is a side elevational view of the mated seated members in a second horizontal position which is the same utilized when in the floor extension position.

To further maximize the cargo space available within the vehicle, the second seat 18 is either convertibly moved forward or removed from the vehicle. Referring to FIG. 5 the mated vehicle seat members 12 and 14 in the first vertical position are angularly displaced forwardly allowing the upper seat 16 back to provide an extension of floor 24. Seat back 16 is now at a lower elevation than the elevation of femur member 14 in the seated or first horizontal position. The above-described angular displacement from the first vertical position is achieved by simple rotation of the mated seat members 12 and 14 about its third link pivot point 44.

Figure 4:
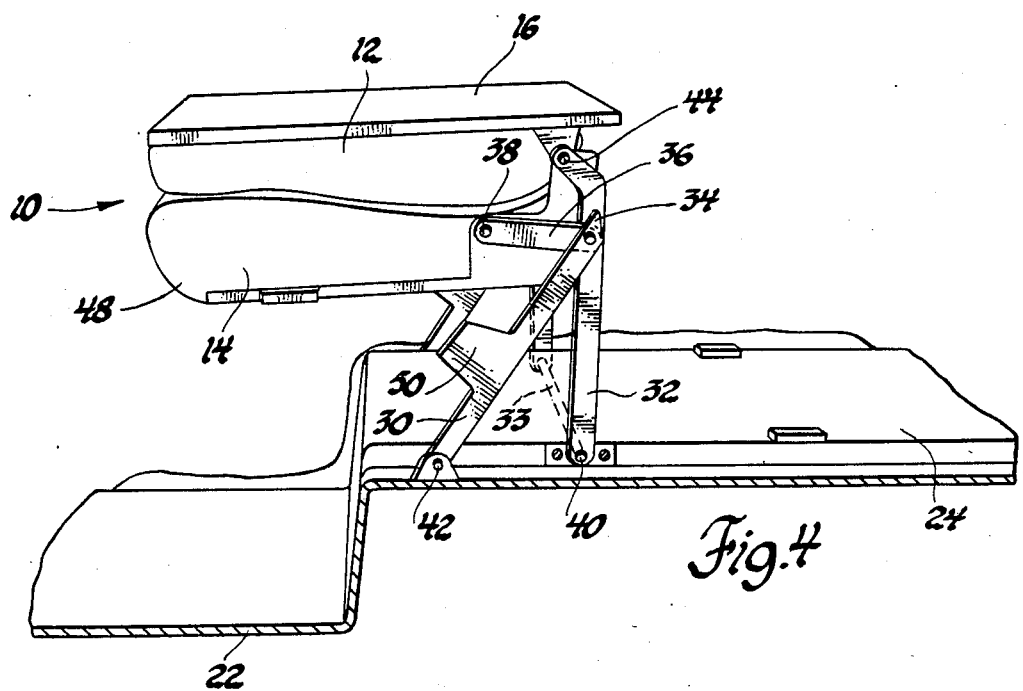
FIG. 4 is a side elevational view of a forward intermediate horizontal position of the mated seated members.

The vehicle seat can also be moved into the configuration as illustrated in FIG. 5 from the normal seated position by moving it from the first horizontal position illustrated in FIG. 1 to a forward intermediate horizontal position as illustrated in FIG. 4. From the intermediate horizontal position, forward end 48 is nosed downward into the position illustrated in FIG. 5.

To place the seat back into the original sitting position from either optional position only requires a reversal of steps heretofore described.

The present invention provides a method of adjusting a vehicle convertible seat from a regular seating position to a second generally horizontal position forward and lower than the regular seating position, the seat including an upper seat member with a back in a generally vertically orientation and a femur member adjacent the upper member extending forward in a generally horizontally orientation, the method including the following steps:

1. Angularly displacing said upper member to mate with said femur member in a first horizontal position wherein said upper member back is above said femur member;
2. Angularly displacing the mated seat members to a generally first vertical position forward of said first horizontal position wherein the upper seat back is rearward of said femur member;
3. Forwardly displacing said mated seat members from said first vertical position to a second generally horizontal position forward and lower than said first horizontal position and the regular seating position.

In most embodiments the first, second, and third links will be on both sides of seat 10. To provide added stiffness the third links 32 can be fixably joined by a cross link 33. It will also be readily apparent to those skilled in the art of other various modifications which can be made to the described embodiments of the present invention without departing from the spirit and scope of this application as it is encompassed by the following claims.

The embodiments of the invention in which an exclusive property or privilege is claimed are defined as follows:

1. A vehicle convertible seat comprising in combination:
    an upper seat member having a back in a generally vertical orientation;
    a femur member adjacent said upper member extending forward in a generally horizontal orientation;
    means for angularly displacing said upper member to mate with said femur member in a first horizontal position wherein said upper member back is above said femur member;
    means for angularly displacing said mated seat members to a first generally vertical position forward of said first horizontal position wherein said upper seat back is rearward of said femur member; and
    means for displacing said mated seat members from said first horizontal position to a second generally horizontal position forward and lower than said first horizontal position.
2. A vehicle convertible seat as described in claim 1 further including means for angularly displacing said mated seats from said first horizontal position to an intermediate upper vertically extended position wherein said upper seat back is rearward of said femur member and said convertible seat also having means for displacing said mated seat members downward from said upper vertically extended position to said first vertical position.

3. A vehicle convertible seat as described in claim 1 further including means to displace said mated seat members to an intermediate horizontal position forward of said first horizontal position and said seat including means for forwardly displacing said intermediate horizontal mated seat members to said second horizontal position.

4. A vehicle convertible seat as described in claim 1 wherein an elevation of said seat back in said second horizontal position is lower than said femur member when said femur member is in said first horizontal position.

5. A vehicle convertible seat comprising in combination:
an upper seat member having a back in a generally vertical orientation;
a femur member adjacent said upper member extending forward in a general horizontal orientation;
means for angularly displacing said upper member to mate with said femur member in a first horizontal position wherein said upper member back is above said femur member;
means for angularly displacing said mated seat members from said first horizontal position to an intermediate vertically extended position wherein said seat back is rearward of said femur member;
means for displacing downward from said intermediate vertical position said mated seat members to a first generally vertical position;
means for angularly displacing said mated seated members from said first vertical position to a second horizontal position forward and lower than said first horizontal position wherein said seat back is above said femur member;
means for forwardly displacing said mated seated members from said first horizontal position to a forward intermediate horizontal position; and
means for forwardly displacing said mated seat members from said intermediate horizontal position to said second horizontal position.

6. A vehicle convertible seat as described in claim 1 for utilization in a vehicle having at least two separate floor levels wherein said seat in its first horizontal position is on a first vehicle floor level and when said vehicle seat is displaced to said second horizontal position, said seat back provides an extension of said first vehicle floor level over said second vehicle floor level.

7. A vehicle convertible seat comprising in combination:
an upper seat member having a back in a generally vertical orientation;
a femur member adjacent said upper member extending forward in a general horizontal orientation;
a first link with a forward end and a rearward end, said first link forward end being pivotally connected with said vehicle and said first link extending rearwardly from said pivotal connection with said vehicle;

a second link pivotally connected with said first link adjacent said rearward end of said first link, said second link being pivotally connected with said femur member at an end of said second link opposite said second link pivotal connection with said first link;
a third link having first and second ends and said third link first end being pivotably connected with said vehicle rearward of the pivotal connection of said forward end of said first link with said vehicle and said third link having means of pivotable connection with said femur member and said upper seat member and wherein said seat has a first horizontal position wherein said upper seat member mates with said femur seat member and said upper seat back is above said femur member and said seat being convertible to a first vertical position from said first horizontal position wherein said seat back is rearward of said femur member and said seat being convertible to a second horizontal position wherein said mated seat members are forwardly and lowerly displaced from said first horizontal position and wherein said seat back is above said femur member.

8. A vehicle convertible seat as described in claim 7 wherein said third link shares a common pivotable axis with said upper seat member and said femur member.

9. A vehicle convertible seat as described in claim 7 wherein said femur member in said first horizontal position is generally higher than said upper seat back in said second horizontal position.

10. A vehicle convertible seat as described in claim 7 wherein said first and third link pivotable connections with said vehicle are horizontally aligned.

11. A vehicle convertible seat as described in claim 7 wherein said femur member is partially supported by an arm projecting generally vertically upward from said first link.

12. A method of adjusting a vehicle convertible seat from a regular seating position to a generally horizontal position forward and lower than said regular seating position, said seat having in said regular seating position an upper seat member with a back in a generally vertical orientation and a femur member adjacent said upper member extending forward in a generally horizontal orientation, said method including:
angularly displacing said upper member to mate with said femur member in a first horizontal position wherein said upper member back is above said femur member;
angularly displacing said mated seat members to a generally first vertical position forward of said first horizontal position wherein said upper seat back is rearward of said femur member; and
forwardly displacing said mated seat members from said first vertical position to a second generally horizontal position forward and lower than said first horizontal position and said regular seating position.

13. A method as described in claim 12 further including angularly displacing said mated seat members from said first vertical position to said second horizontal position.

* * * * *